(12) United States Patent
Upton et al.

(10) Patent No.: US 6,735,688 B1
(45) Date of Patent: *May 11, 2004

(54) PROCESSOR HAVING REPLAY ARCHITECTURE WITH FAST AND SLOW REPLAY PATHS

(75) Inventors: Michael D. Upton, Portland, OR (US); David J. Sager, Portland, OR (US); Darrell Boggs, Aloha, OR (US); Glenn J. Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,853

(22) Filed: Feb. 14, 2000

Related U.S. Application Data

(63) Continuation-in-part of application No. 09/222,805, filed on Dec. 30, 1998, now Pat. No. 6,212,626, which is a continuation-in-part of application No. 08/746,547, filed on Nov. 13, 1996, now Pat. No. 5,966,544.

(51) Int. Cl.[7] .................................................. G06F 9/00
(52) U.S. Cl. ........................ 712/218; 712/23; 712/219
(58) Field of Search ........................ 712/32, 218, 23, 712/219

(56) References Cited

U.S. PATENT DOCUMENTS

| 3,618,042 | A | | 11/1971 | Miki et al. |
| 5,828,868 | A | * | 10/1998 | Sager et al. .................. 712/32 |
| 5,966,544 | A | * | 10/1999 | Sager .......................... 712/32 |
| 6,094,717 | A | * | 7/2000 | Sager et al. |
| 6,098,166 | A | * | 8/2000 | Leibholz et al. ............. 712/216 |
| 6,212,626 | B1 | * | 4/2001 | Merchant et al. ........... 712/218 |

FOREIGN PATENT DOCUMENTS

| WO | WO 98/21684 | 5/1998 |

\* cited by examiner

*Primary Examiner*—Larry D Donaghue
(74) *Attorney, Agent, or Firm*—Blakely, Sokoloff, Taylor & Zafman LLP

(57) ABSTRACT

According to one aspect of the invention, a microprocessor is provided that includes an execution core, a first replay mechanism and a second replay mechanism. The execution core performs data speculation in executing a first instruction. The first replay mechanism is used to replay the first instruction via a first replay path if an error of a first type is detected which indicates that the data speculation is erroneous. The second replay mechanism is used to replay the first instruction via a second replay path if an error of a second type is detected which indicates that the data speculation is erroneous.

23 Claims, 6 Drawing Sheets

PROCESSOR HAVING REPLAY ARCHITECTURE WITH FAST AND SLOW REPLAY PATHS

CROSS-REFERENCES TO RELATED APPLICATIONS

This application is a continuation-in-part of application Ser. No. 09/222,805, filed on Dec. 30, 1998, now U.S. Pat. No. 6,212,676 which is a continuation-in-part of application Ser. No. 08/746,547, filed on Nov. 23, 1996, now U.S. Pat. No. 5,966,544. This application and the above-identified applications are all assigned to Intel Corporation of Santa Clara, Calif.

BACKGROUND OF THE INVENTION

1. Field of the Invention

The present invention relates generally to the field of processors, and more specifically to a replay architecture having fast and slow replay paths for facilitating data-speculating operations.

2. Background Information

FIG. 1 shows a block diagram of one embodiment of a processor 100 disclosed in U.S. Pat. No. 5,966,544. The processor 100 shown in FIG. 1 includes an I/O ring 111 which operates at a first clock frequency (I/O clock), a latency-tolerant execution core 121 which operates at a second clock frequency (e.g., slow clock), a latency-intolerant execution sub-core 131 which operates at a third clock frequency (e.g., medium clock), and a latency-critical execution sub-core 141 which operates at a fourth clock frequency (e.g., fast clock). The processor 100 shown in FIG. 1 also includes clock multiplication and/or division units 110, 120, and 130 which are configured to provide appropriate clocking to the various portions or sub-cores of the processor 100, as taught in the prior application. The specific portion of the prior application's teachings which is most pertinent here is that the execution core may include two or more portions (sub-cores) which operate at different clock rates.

In operation, the I/O ring 111 communicates with the rest of the computer system (not shown) by performing various I/O operations, such as memory reads and writes, at the I/O clock frequency. For example, the processor 100 may perform an I/O operation at the I/O ring 111 at the I/O clock frequency to read in data from an external memory device. The various execution sub-cores 121, 131, and 141 can perform various functions or operations with respect to the input instructions and/or input data at their respective clock frequencies. For example, the latency-tolerant execution sub-core 121 may perform an execution operation on the input data to produce a first result. The latency-intolerant sub-core 131 may perform an execution operation on the first result to produce a second result. Similarly, the latency-critical execution sub-core 141 may perform another execution operation on the second result to produce a third result. The various operations performed by the various execution sub-cores may include arithmetic operations, logic operations, and other operations, etc. It should be appreciated and understood by one skilled in the art that the execution order in which the various operations are performed need not necessarily follow the hierarchical order of the various execution sub-cores. For example, the input data could go immediately and directly to the innermost sub-core and the result obtained therefrom could go from the innermost sub-core to any other sub-core or back to the I/O ring 111 for write-back. In addition, as it is disclosed and taught in the prior application, on-chip cache structures may be split across two or more portions of the processor 100. As such, certain operations and/or functions can be performed at one clock frequency with respect to one aspect of the data stored in the on-chip cache while other operations and/or functions can be performed at a different frequency with respect to another aspect of the data stored in the on-chip cache. For example, a way predictor miss with respect to the on-chip cache may be performed in one sub-core at one clock frequency while the TLB hit/miss detection and/or page fault detection may be performed in another sub-core at a different frequency. As such, certain errors and conditions can be detected earlier in the execution process than other errors and conditions.

FIG. 2 illustrates a block diagram of one embodiment of a processor 200 disclosed in the prior application which includes a generalized replay architecture to facilitate data speculation operations. In this embodiment, the processor 200 includes a scheduler 231 coupled to a multiplexor 241 to provide instructions received from an instruction cache (I-cache) 211 to an execution core 251 for execution. The execution core 251 may perform data speculation in executing the various instructions received from the multiplexor 241. The processor 200 as shown in FIG. 2 includes a checker unit 281 to send a copy of the executed instruction back to the execution core 251 for re-execution (replay) if it is determined that the data speculation is erroneous. However, in this generalized replay architecture, the checker unit 281 is positioned after the execution core 251, after the TLB and tag logic 261, and after the cache hit/miss logic 271. Some instructions may have been known to have been executed incorrectly (i.e., because data speculation is erroneous) earlier than this checker positioning would permit detection. Specifically, there are cases in which certain errors and conditions can be detected earlier which indicates that data speculation in these cases is erroneous even before the TLB/TAG logic 261 and the hit/miss logic 271 are executed. Unfortunately, because of the current positioning of the checker unit 281, the respective instructions that were executed incorrectly due to erroneous data speculation would not be sent back to the execution core 251 for re-execution or replay until they reach the checker unit 281. Thus, there is an unnecessary delay between the time when an instruction is known to have been executed incorrectly due to erroneous data speculation until the time when the respective instruction is actually sent back for re-execution. Thus, the system performance is not being optimized as much as it could have been had those instructions which were executed incorrectly been re-executed or replayed earlier in the process.

SUMMARY OF THE INVENTION

According to one aspect of the invention, a microprocessor is provided that includes an execution core, a first replay mechanism and a second replay mechanism. The execution core performs data speculation in executing a first instruction. The first replay mechanism is used to replay the first instruction via a first replay path if an error of a first type is detected which indicates that the data speculation is erroneous. The second replay mechanism is used to replay the first instruction via a second replay path if an error of a second type is detected which indicates that the data speculation is erroneous.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be practiced without these specific details.

In the discussion below, the teachings of the present invention are utilized to implement a method, apparatus, and system for facilitating data speculation in executing input instructions. To reduce execution time, an execution unit performs data speculation in executing an input instruction. If the data speculation is erroneous, the input instruction is re-executed by the execution unit until the correct result is obtained. In one embodiment, the data speculation is determined to be erroneous if errors of a first type or errors of a second type are detected. Errors of the first type can be detected earlier than the errors of the second type. In one embodiment, a first checker is responsible for sending a first copy of the input instruction back to the execution unit for re-execution or replay if an error of the first type is detected with respect to the execution of the input instruction. A second checker is responsible for sending a second copy of the input instruction back to the execution unit for re-execution or replay if an error of the second type is detected with respect to the execution of the input instruction. In one embodiment, a selector is used to provide either a subsequent input instruction, the first copy of the incorrectly executed instruction or the second copy of the incorrectly executed instruction to the execution unit for execution, based upon a predetermined priority scheme. The teachings of the present invention are applicable to any processor or machine that performs data speculation in executing instructions. However, the present invention is not limited to processors or machines that perform data speculation and can be applied to any processor and machine in which multiple levels of replay mechanism is needed.

Figure 1:
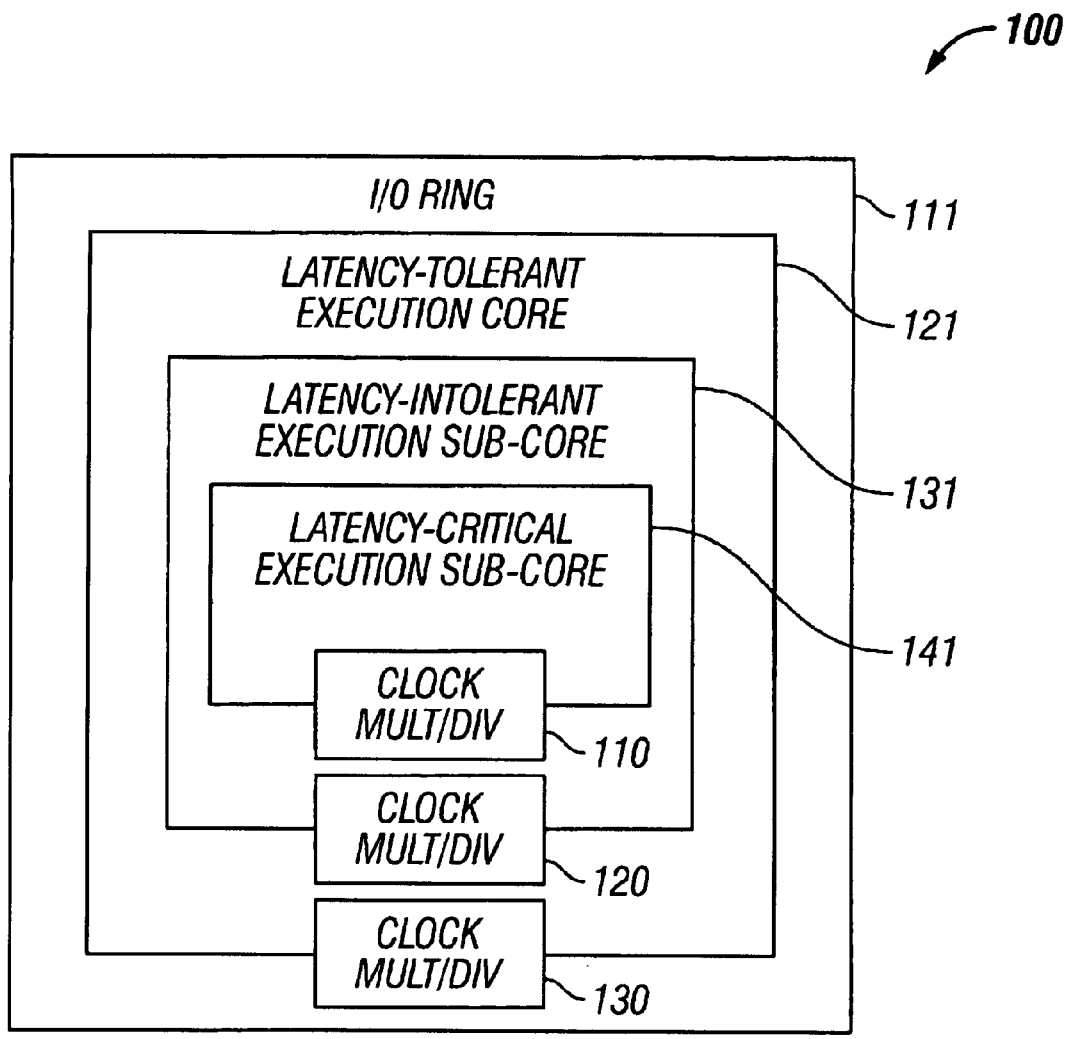
FIG. 1 is a block diagram of one embodiment of a processor including various sub-cores operated at different frequencies.
Figure 2:
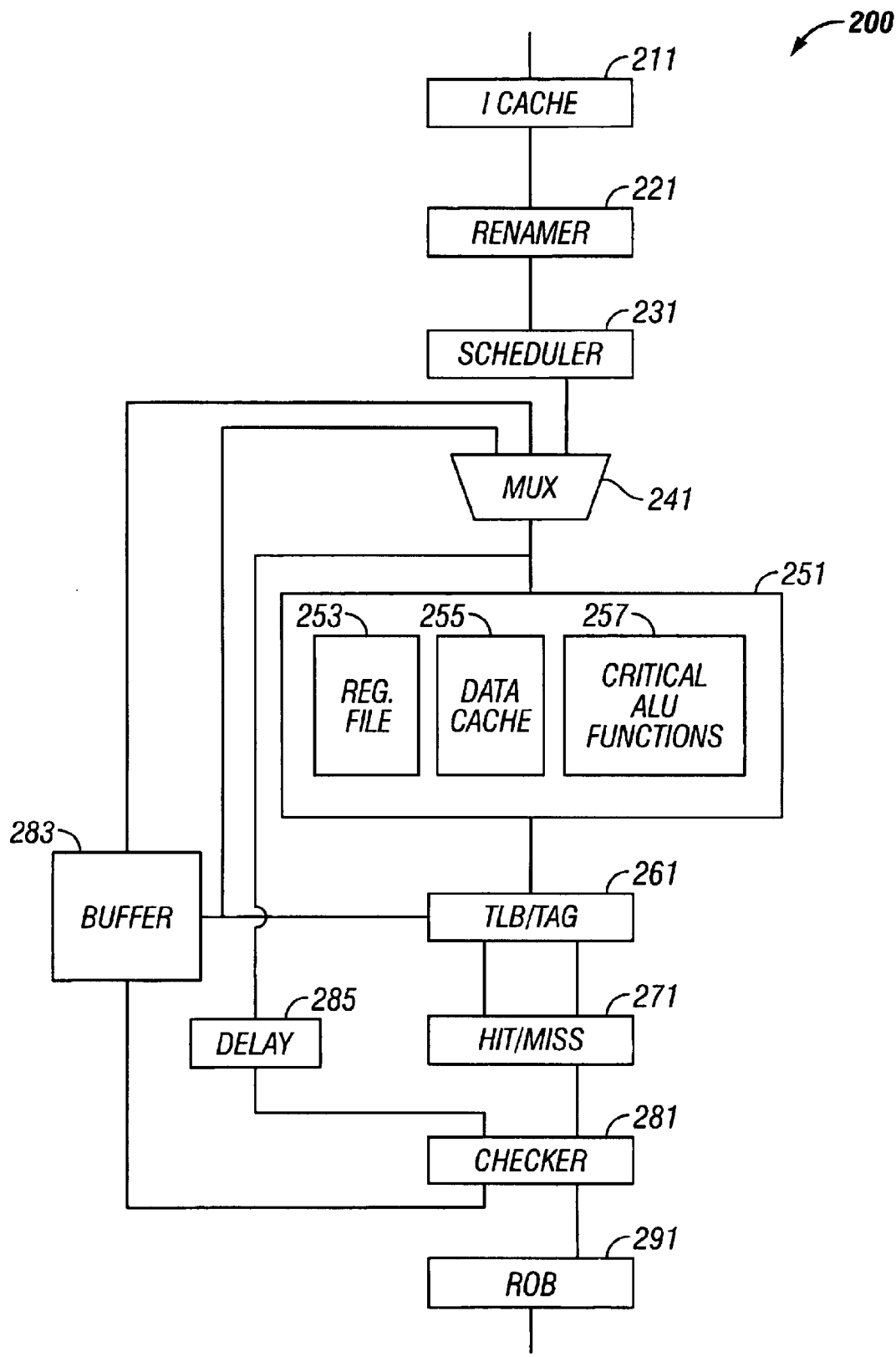
FIG. 2 shows a block diagram of one embodiment of a processor having a generalized replay architecture.
Figure 3:
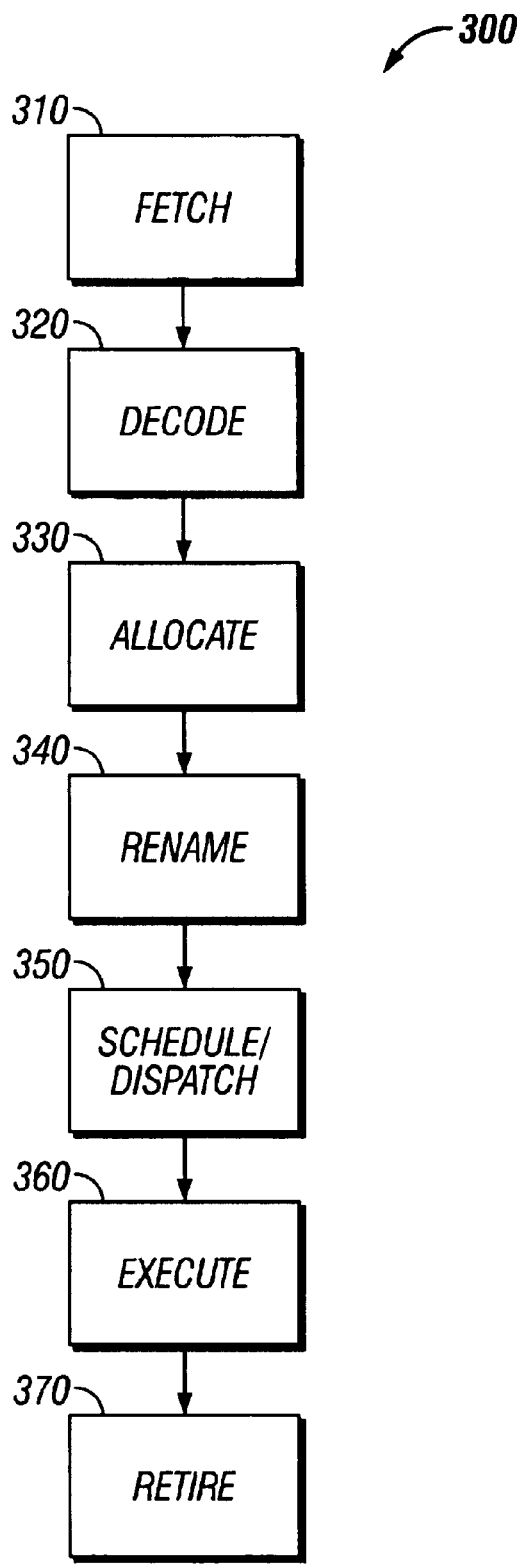
FIG. 3 illustrates a flow diagram of one embodiment of a processor pipeline in which the teachings of the present invention are implemented.

FIG. 3 is a block diagram of one embodiment of a processor pipeline 300 within which the present invention may be implemented. For the purposes of the present specification, the term "processor" refers to any machine that is capable of executing a sequence of instructions and shall be taken to include, but not be limited to, general purpose microprocessors, special purpose microprocessors, graphics controller, audio processors, video processors, multi-media controllers and micro-controllers. The processor pipeline 300 includes various processing stages beginning with a fetch stage 310. At this stage, instructions are retrieved and fed into the pipeline 300. For example, a macroinstruction may be retrieved from a cache memory that is integral within the processor or closely associated therewith, or may be retrieved from an external memory unit via a system bus. The instructions retrieved at the fetch stage 310 are then input into a decode stage 320 where the instructions or macroinstructions are decoded into microinstructions or micro-operations (also referred as UOPs or uops herein) for execution by the processor. At an allocate stage 330, processor resources necessary for the execution of the microinstructions are allocated. The next stage in the pipeline is a rename stage 340 where references to external registers are converted into internal register references to eliminate false dependencies caused by register reuse. At a schedule/dispatch stage 350, each microinstruction or UOP is scheduled and dispatched to an execution unit. The microinstructions or UOPs are then executed at an execute stage 360. After execution, the microinstructions are then retired at a retire stage 370.

In one embodiment, the various stages described above can be organized into three phases. The first phase can be referred to as an in-order front end including the fetch stage 310, decode stage 320, allocate stage 330, and rename stage 340. During the in-order front end phase, the instructions proceed through the pipeline 300 in their original program order. The second phase can be referred to as the out-of-order execution phase including the schedule/dispatch stage 350 and the execute stage 360. During this phase, each instruction may be scheduled, dispatched and executed as soon as its data dependencies are resolved and the appropriate execution unit is available, regardless of its sequential position in the original program. The third phase, referred to as the in-order retirement phase which includes the retire stage 370 in which instructions are retired in their original, sequential program order to preserve the integrity and semantics of the program.

In a processor having a replay architecture, certain liberties may be taken with respect to the scheduling and execution of the input instructions. For example, an input UOP may be dispatched to the execution unit for execution even though its source data may not have been ready or known. If it is determined that the data speculation is erroneous with respect to the execution of the input UOP, the respective UOP can be sent back to the execution unit for re-execution (replay) until the correct result is obtained. It is, of course, desirable to limit the amount of replay or re-execution, as each replayed UOP uses available resources and degrades overall system performance. Nevertheless, gain in net performance may be obtained by taking such chances. For example, if the majority of UOPs get executed correctly in a reduced number of cycles, and only a few UOPs have to be replayed, then the overall throughput will improve compared with the lowest-common-denominator case of making all UOPs wait as long as the worst case might take.

As taught in the prior application, the on-chip data cache (also referred to as the level zero or L0 data cache) may be split such that its data storage array resides in a higher clock domain than the logic which provides hit/miss determination with respect to the data storage array. The TLB and tag logic may also reside in a slower clock domain than the data storage array. The TLB and tag logic may be, but are not required to be, in the same clock domain as the hit/miss logic.

One of the instances where net performance gain may be obtained is in the case of UOPs the execution of which relies on or uses data from the L0 data cache. Rather than making all UOPs wait until their source data are determined to be valid, it is better to speculatively dispatch and execute some UOPs so early in the process even though it cannot yet be known—but is likely and suspected—that their source data reside in the L0 data cache. In the majority of cases, the L0 data cache will be hit and valid data will be used as sources. In only a small number of cases, the data speculation is erroneous and the UOPs will have to be replayed. As such, the majority of UOPs are correctly executed in a reduced number of cycles, thus improving the overall performance.

Figure 4:
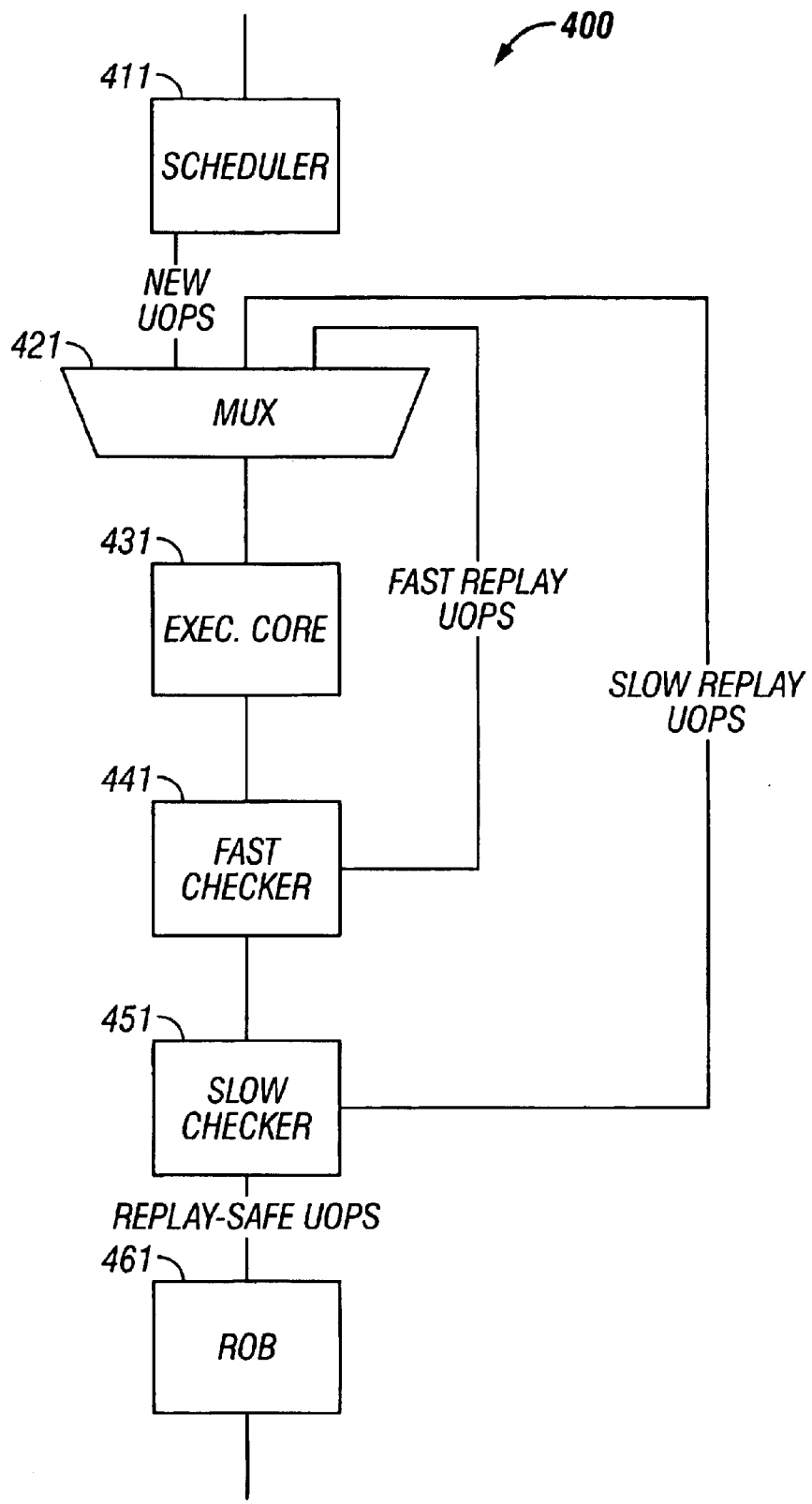
FIG. 4 shows a block diagram of one embodiment of a processor having first and second replay mechanisms.

FIG. 4 is a block diagram of one embodiment of a processor 400 having first (also referred to as fast or early) and second (also referred to as slow or late) replay paths to facilitate data speculation in executing instructions. As shown in FIG. 4, the processor 400 includes a scheduler/dispatcher 411 coupled to an instruction cache (not shown) to schedule and dispatch a first instruction received from the instruction cache to an execution core 431 for execution via a selector (e.g., multiplexor) 421. The execution core 431, in one embodiment, performs data speculation in executing an input instruction. As described above, the input instruction may be dispatched and executed even though its source data may not have been ready or known. For example, the execution of the input instruction may require source data that may or may not be in the L0 data cache. However, as explained above, net performance may be gained by speculating that the required source data for the execution of the input instruction reside in the L0 data cache. The processor 400 further includes a first replay mechanism 441 to replay the input instruction if an error of a first type is detected indicating that the data speculation is erroneous. In one embodiment, the error of the first type is detectable within a first period. The processor 400 also includes a second replay mechanism 451 to replay the input instruction if an error of a second type is detected indicating that the data speculation is erroneous. In one embodiment, the error of the second type is detectable within a second period which is longer than the first period. As such, if an error of a first type is already detected, the present invention allows the incorrectly executed instruction to be replayed much faster than it would have been if the instruction had to wait until an error of a second type is detected. As shown in FIG. 4, if it is determined that the execution of the input instruction is performed incorrectly because an error of the first type has been detected which indicates that the data speculation is erroneous, the first replay mechanism (the fast or early checker) 441 will send the respective instruction back to the execution core 431 for re-execution (replay) via the multiplexor 421. Likewise, if it is determined that the execution of the input instruction is incorrect because an error of the second type has been detected which indicates that the data speculation is erroneous or that other error conditions are present, the second replay mechanism (the slow or late checker) 451 will send the respective instruction back to the execution core 431 for re-execution (replay) via the multiplexor 421. The functions and operations of the first and second replay mechanisms shown in FIG. 4 are described in more detail below.

Figure 5:
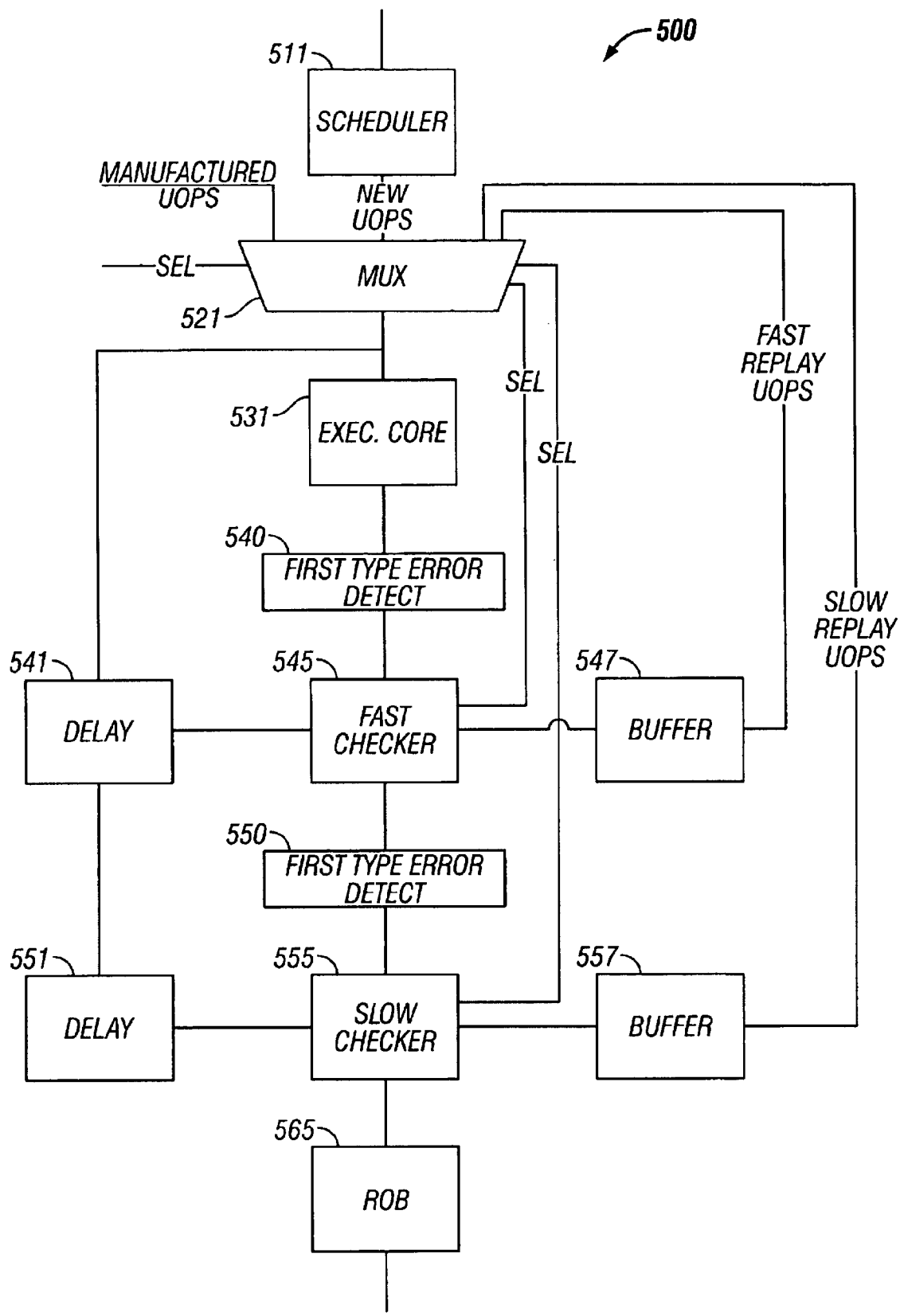
FIG. 5 shows a more detailed block diagram of one embodiment of a processor having first and second replay mechanisms.

FIG. 5 shows a more detailed block diagram of one embodiment of a processor 500 having first and second replay paths as described above with respect to FIG. 4. As shown in FIG. 5, the processor 500 includes a scheduler 511 that schedules and dispatches instructions received from an instruction cache (not shown) to an execution core 531 for execution via a multiplexor 521. The function and operation of the multiplexor 521 is described in detail below. In one embodiment, the execution core 531 performs data speculation in executing an input instruction received from the multiplexor 521. The processor 500 further includes a first delay unit 541 to make a first copy of the input instruction and to hold the first copy of the input instruction for at least one clock cycle in a first clock domain. The processor 500 also includes a first checker 545 coupled to the first delay unit 541 and the execution core 531. In one embodiment, the first checker 545 is configured to determine whether the data speculation is erroneous with respect to a first set of error types and to send the first copy of the input instruction back to the execution core via a first buffer 547 for re-execution if the data speculation is erroneous with respect to the first set of error types. As shown in FIG. 5, the processor 500 further includes a second delay unit 551 coupled to the first delay unit and configured to make and hold a second copy of the input instruction for at least one clock cycle in a second clock domain in one embodiment. The processor 500 includes a second checker 555 coupled to the second delay unit 551 and the first checker 545. In one embodiment, the second checker is configured to determine whether the execution of the instruction is erroneous with respect to a second set of error types and to send the second copy of the input instruction back to the execution core 531 for re-execution via a second buffer 557 if the execution is erroneous with respect to the second set of error types. As shown in FIG. 5, the multiplexor 521 is coupled to the scheduler 511, the execution core 531, the first delay unit 541, the first checker 545, the second checker 555, the first buffer 547, and the second buffer 557. In one embodiment, the multiplexor 521 is configured to receive the input instruction and a subsequent instruction from the instruction cache, the first copy of the input instruction from the first checker and the second copy of the input instruction from the second checker. In one embodiment, the multiplexor 521 is further configured to selectively provide either the subsequent instruction, the first copy of the input instruction, or the second copy of the input instruction to the execution core 531 for execution, based on a predetermined priority scheme. In one embodiment, the second copy of the input instruction is given a first priority for execution, the first copy of the input instruction is given a second priority for execution, and the subsequent instruction is given a third priority for execution. In one embodiment, the first priority is higher than the second priority and the second priority is higher than the third priority. In one embodiment, the first set of error types is a subset of the second set of error types. In another embodiment, the first set of error types is complimentary to the second set of error types. In one embodiment, the first set of error types includes an error indicating that a level zero cache way predictor is missed, an error indicating that the level zero cache CAM extension is mismatched, and an error indicating that a store forwarding buffer data is unknown. In one embodiment, the second set of error types contains an error indicating a TLB miss, and an error indicating a page-fault, or any other error type indicating that the instruction was executed incorrectly and that the respective instruction needs to be replayed, etc. In one embodiment, first delay unit 541 is configured to provide the first copy of the input instruction to the first checker 545 after a predetermined number of clock cycles in the first clock domain. In one embodiment, the predetermined number of clock cycles in the first clock domain corresponds approximately to a time delay of the input instruction through the execution core.

There are instances where another unit within the processor 500 can generate its own instructions to perform its corresponding function. For example, a memory control unit or memory execution unit (not shown) in the processor 500 may occasionally need to dispatch instructions for execution within its own pipeline including full store operations, or UOPs to handle page splits and TLB reloading, etc. These types of instructions are referred to as manufactured instructions because they are generated or manufactured by a unit within the processor 500 and are not in the instruction flow from the instruction cache. In one embodiment, the multiplexor 521 is also coupled to receive the manufactured instructions and send them to the execution core 531 for execution. Since multiplexor 521 may receive instructions from different paths at the same time, a predetermined priority scheme is needed to coordinate the execution priority between the instructions sent to the multiplexor 521 from different paths. For example, the multiplexor may, in the same processing period or clock cycle, receive a subsequent instruction from the scheduler 511, a first copy of the input instruction to be replayed from the first checker 545, another input instruction to be replayed from the second checker 555, and also a manufactured instruction from another unit (e.g., the memory control or execution unit). In one embodiment, the multiplexor 521 gives a low priority to instructions coming from the instruction cache, a medium priority to replay instructions coming from the first checker, a high priority to replay instructions coming from the second checker, and a highest priority to manufactured instructions.

As mentioned above, in one embodiment, the error conditions detected by the first checker 545 can be a subset of the error conditions detected by the second checker 555. In this case, the second checker 555 needs to provide robust checking because a UOP cannot be replayed once it gets by the second checker 555. In another embodiment, the error conditions handled by the first checker 545 can be complimentary to the error conditions handled by the second checker 555. In this case, the first checker 545 would need to provide robust checking on its set of error cases, rather than the "high confidence but not guaranteed" checking described above, because the late checker would not be re-checking the outcome of the early checker. The subset mode is, therefore, preferred.

As described previously, the second checker 555 can provide additional and/or complimentary checking on error cases that are not handled by the first checker 545. The decision as to what cases are handled by which checker may be driven by various factors including, but not limited to, concerns of processor performance, design complexity, die area, etc. In one embodiment, the second checker 555 is responsible for replaying instructions due to TLB misses and other various problems that may arise, for example, in the memory control unit (not shown) of the processor 500. These various problems may include problems or error conditions that are hard to detect in a short amount of time, such as cache miss based on full physical address check, incorrect forwarding from store based on full physical address check, etc.

In one embodiment, the first checker 545 and the second checker 555 cooperate to control the operation of the multiplexor 521. As shown in FIG. 5, the multiplexor 521 performs its corresponding function based upon the select signals received from the first checker 545, the second checker 555, and optionally another select signal from another unit such as the memory control unit (not shown) that generates a manufactured instruction that is not in the instruction flow from the instruction cache. These various select signals are used by the multiplexor 521 to determine which instruction is to be sent to the execution core 531 for execution in a given processing cycle if there are more than one instruction from different paths waiting to be executed. In one embodiment, manufactured instructions are given the first execution priority, the instructions coming from the second checker 555 are given the second priority which is lower than the first priority, the instructions coming from the first checker are given the third priority which is lower than the second priority, and subsequent instructions coming from the instruction cache via the scheduler 511 are given the fourth priority which is lower than the third priority.

In one embodiment, once a particular UOP has been sent around for fast replay by the first checker 545, the same instantiation of that UOP would not also be sent around for slow replay by the second checker 555 because a duplicate would exist. To prevent this from happening, in one embodiment, each UOP may include some special fields that can be used by the first checker 545 and the second checker 555 to coordinate the replay activities between the two checkers. For example, in one embodiment, a UOP may include a field referred to as NEEDS_FAST_REPLAY field, which is set by the first checker 545 to indicate that the first checker 545 wants to send it around for fast replay. The respective UOP may also include another field called GOT_FAST_REPLAY field. The GOT_FAST_REPLAY field, in one embodiment, is set by a cooperation between the first checker 545 and the second checker 555. For example, assuming that the first checker wants to send a first instruction around for fast replay because an error of a first type has been detected. In this case, the first checker 545 will set the corresponding NEEDS_FAST_REPLAY field of the respective UOP to indicate that this particular UOP needs to be replayed on the fast replay path. If the second checker 555 wants to send a second UOP around for slow replay in the same clock cycle, the GOT_FAST_REPLAY field of the first instruction will be cleared and the multiplexor 521 will be controlled to select the slow replay UOP instead of the one seeking fast replay. Later, when the first UOP reaches the second checker 555, it will be sent around for replay on the slow replay path because its corresponding NEEDS_FAST_REPLAY field has been set.

Figure 6:
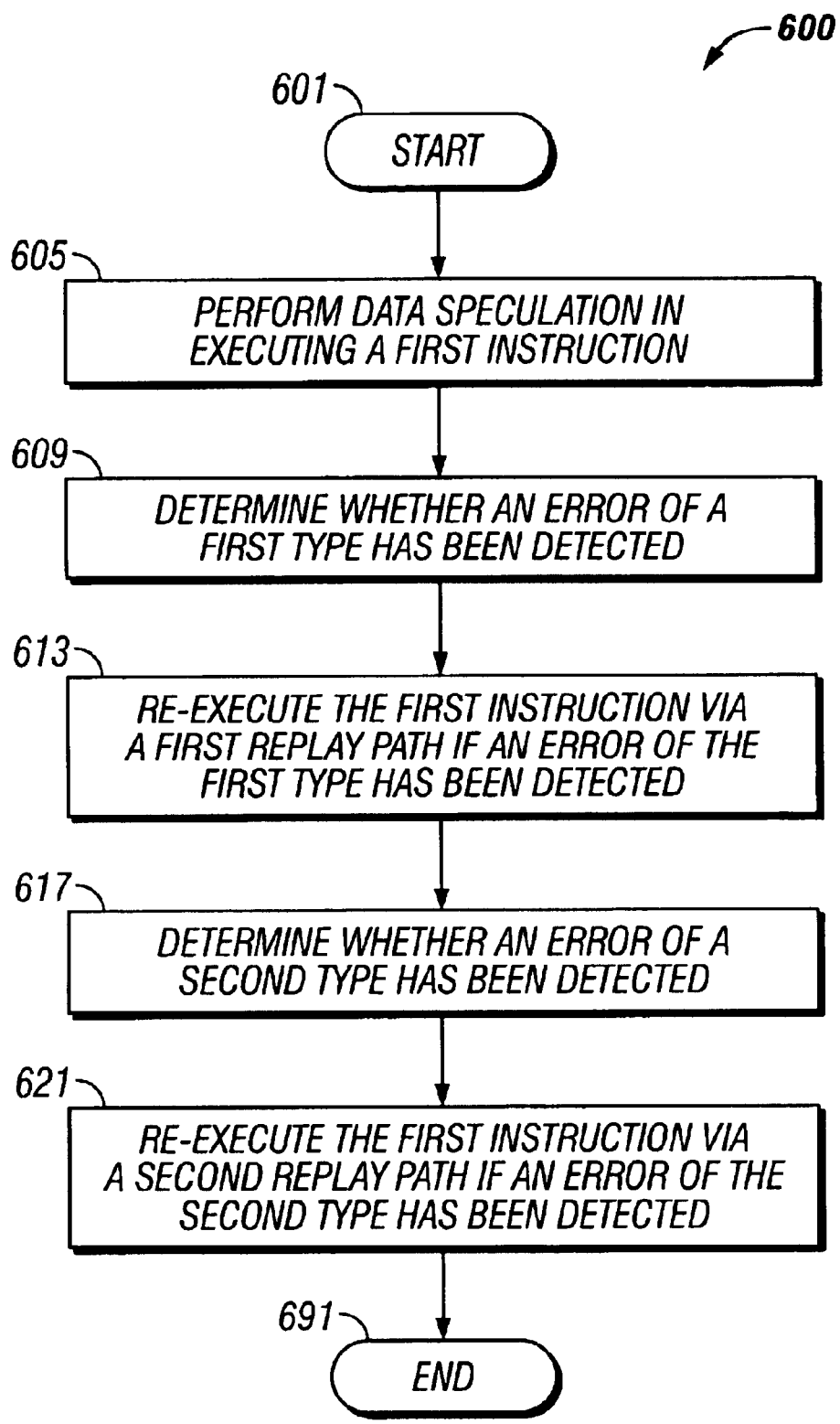
FIG. 6 shows a flow diagram of one embodiment of a method according to the teachings of the present invention.

FIG. 6 illustrates a flow diagram of one embodiment of a method 600 for using fast and slow replay paths to facilitate data speculation operations. The method 600 starts at block 601 and proceeds to block 605. At block 605, an execution core or unit performs data speculation in executing an input instruction. The method 600 then proceeds from block 605 to block 609. At block 609, it is determined whether an error of a first type has been detected. As explained above, in one embodiment, an error of the first type occurs if the L0 data cache way predictor is missed, in which case the data cannot be in the L0 data cache, the L0 data cache CAM extension is mismatched (i.e., the way predictor hits but the tags do not match), or store forwarding buffer data unknown (i.e., the data is supposed to be forwarded from a store forwarding buffer but the store data is unavailable), etc. At block 613, the input instruction is re-executed if an error of the first type has been detected. As described above, when an error of the first type is detected, a first checker unit (i.e., the fast or early checker) will send a copy of the input instruction around for replay or re-execution on the fast replay path. The method 600 then proceeds to block 617. At block 617, it is determined whether an error of a second type has been detected. In this embodiment, a second checker (i.e., a slow or late checker) is responsible for determining whether an error of the second type has occurred. At block 621, if an error of the second type has occurred, the input instruction is re-executed. As described above, the second checker is responsible for sending a copy of the input instruction around for replay on the slow replay path if an error of the second type has occurred.

The invention has been described in conjunction with the preferred embodiment. It is evident that numerous alternatives, modifications, variations and uses will be apparent to those skilled in the art in light of the foregoing description.

What is claimed is:

1. A microprocessor comprising:
   an execution core to perform data speculation in executing a first instruction;
   a first replay mechanism to replay the first instruction via a first replay path if an error of a first type is detected indicating that the data speculation is erroneous, the first replay mechanism including a first delay unit to make a first copy of the first instruction and to hold the first copy for at least one clock cycle in a first clock domain and a first checker to determine whether the error of the first type has been detected and to send the first copy of the first instruction back to the execution core for replay if the error of the first type has been detected; and
   a second replay mechanism to replay the first instruction via a second replay path if an error of a second type is detected indicating that the data speculation is erroneous, the second replay mechanism including a second delay unit to make a second copy of the first instruction and to hold the second copy for at least one clock cycle in a second clock domain and a second checker to determine whether the error of the second type has been detected and to send the second copy of the first instruction back to the execution core for replay if the error of the second type has been detected.

2. The microprocessor of claim 1 wherein the error of the first type is detectable within a first period and the error of the second type is detectable within a second period which is longer than the first period.

3. The microprocessor of claim 1 further comprising:
   an instruction cache to store and provide the first instruction and a subsequent instruction to the execution core.

4. The microprocessor of claim 3 further comprising:
   a selector coupled to receive the subsequent instruction from the instruction cache, the first copy of the first instruction from the first checker, another instruction from the second checker, the selector to provide to the execution core for execution either the subsequent instruction from the instruction cache, the first copy of the first instruction from the first checker, or said another instruction from the second checker, based upon a predetermined priority scheme.

5. The microprocessor of claim 4 wherein the selector comprises a multiplexor.

6. The microprocessor of claim 4 wherein said another instruction is given a first priority for execution, the first copy of the first instruction is given a second priority for execution which is lower than the first priority, and the subsequent instruction is given a third priority for execution which is lower than the second priority.

7. The microprocessor of claim 1 wherein errors of the first type are a subset of errors of the second type.

8. The microprocessor of claim 1 wherein errors of the first type are complimentary to errors of the second type.

9. The microprocessor of claim 1 wherein the error of the first type is selected from the group consisting of an error indicating that a level zero cache way predictor is missed, an error indicating that the level zero cache CAM extension is mismatched, and an error indicating that a store forwarding buffer data is unknown.

10. The microprocessor of claim 1 wherein the error of the second type is selected from the group consisting of an error indicating a TLB miss, and an error indicating incorrect forwarding from store based on full physical address check.

11. The microprocessor of claim 1 wherein the first delay unit is to provide the first copy of the first instruction after a predetermined number of clock cycles in the first clock domain, the predetermined number of clock cycles in the first clock domain corresponding approximately to a time delay of the first instruction through the execution core.

12. The microprocessor of claim 4 further comprising:
    means for manufacturing instructions that are not in an instruction flow from the instruction cache.

13. The microprocessor of claim 12 wherein the selector is coupled to receive the manufactured instructions and send them to the execution core for execution.

14. The microprocessor of claim 13 wherein the selector gives a low priority to instructions coming from the instruction cache, a medium priority to replay instructions coming from the first checker, a high priority to replay instructions coming from the second checker, and a highest priority to the manufactured instructions.

15. A method comprising:
    performing data speculation in executing a first instruction in an execution core;
    re-executing the first instruction through a first replay path in response to an error of a first type indicating that the data speculation is erroneous by making a first copy of the first instruction and holding the first copy of the first instruction for at least one clock cycle in a first clock domain and sending the first copy of the first instruction back to the execution core for execution; and
    re-executing the first instruction through a second replay path in response to an error of a second type indicating that the data speculation is erroneous by making a second copy of the first instruction and holding the second copy of the first instruction for at least one clock cycle in a second clock domain and sending the second copy of the first instruction back to execution core for execution.

16. The method of claim 15 further comprising:
    receiving a subsequent instruction; and
    selectively providing either the subsequent instruction, the first copy of the first instruction from the first replay path, or another instruction from the second replay path to the execution core based on a predetermined priority scheme.

17. The method of claim 16 wherein said another instruction is given a first priority, the first copy of the first instruction is given a second priority which is lower than the first priority, and the subsequent instruction is given a third priority which is lower than the second priority.

18. The method of claim 15 wherein the error of the first type is detectable within a first period and the error of the second type is detectable within a second period which is longer than the first period.

19. The method of claim 15 wherein the error of the first type is a subset of the error of the second type.

20. The method of claim 15 wherein the error of the first type is complimentary to the error of the second type.

21. The method of claim 16 further comprising:
    manufacturing an instruction that is not in an instruction flow from an instruction cache; and
    dispatching the manufactured instruction to the execution core for execution.

22. The method of claim 21 wherein a low priority is given to the subsequent instruction coming from the instruction cache, a medium priority is given to the first copy of the first instruction from the first replay path, a high priority is given to said another instruction from the second replay path, and a highest priority is given to the manufactured instruction.

23. A microprocessor comprising:

means for performing data speculation in executing a first instruction;

means for re-executing the first instruction via a first replay path if an error of a first type is detected indicating that the data speculation is incorrect including means for making a first copy of the first instruction and for holding the first copy for at least one clock period in a first clock domain and means for sending the first copy back to an execution core for re-execution if the error of the first type is detected; and means for re-executing the first instruction via a second replay path if an error of a second type is detected indicating that the data speculation is incorrect including means for making a second copy of the first instruction and for holding the second copy for at least one clock period in a second clock domain and means for sending the second copy back to the execution core for re-execution if the error of the second type is detected.

* * * * *